United States Patent [19]

Leach

[11] Patent Number: 4,729,860
[45] Date of Patent: Mar. 8, 1988

[54] MULTIPLE, THICK GRAPHITE FABRIC PRODUCTION

[75] Inventor: Jack Leach, Greensboro, N.C.

[73] Assignee: Burlington Industries, Inc., Greensboro, N.C.

[21] Appl. No.: 809,795

[22] Filed: Dec. 17, 1985

[51] Int. Cl.$^4$ .............................................. B29D 28/00
[52] U.S. Cl. ...................................... 264/103; 428/36; 428/246; 428/408; 428/902
[58] Field of Search ................ 264/103, 107; 428/408, 428/246, 902, 36; 427/389.9

[56] References Cited

U.S. PATENT DOCUMENTS

| | | | |
|---|---|---|---|
| 3,462,289 | 8/1969 | Rohl et al. | 117/46 |
| 3,573,086 | 3/1971 | Lambdin | 117/46 |
| 3,657,061 | 4/1972 | Carlson et al. | 264/29 |
| 3,991,248 | 11/1976 | Bauer | 428/245 |
| 4,201,611 | 5/1980 | Stover | 156/155 |
| 4,257,835 | 3/1981 | Bompard | 156/92 |
| 4,331,091 | 5/1982 | Parker et al. | 112/262.1 |
| 4,370,390 | 1/1983 | Burk | 428/113 |
| 4,385,957 | 5/1983 | Wackerle et al. | 264/105 |
| 4,438,173 | 3/1984 | Trost | 428/221 |
| 4,464,429 | 8/1984 | Michaud-Soret | 428/117 |
| 4,584,152 | 4/1986 | Leach | 264/103 |

OTHER PUBLICATIONS

Lindauer Dornier Gesellschaft MBH, brochure, pp. 10 and 11.

Primary Examiner—James J. Bell
Attorney, Agent, or Firm—Nixon & Vanderhye

[57] ABSTRACT

Resin impregnated graphite materials used in the aerospace industry, such as to make wing, and empennage and fuselage panels, are constructed in such a way that there is a lower labor content, the probability of delamination is greatly reduced, and there is less chance for damage of the components since there is less handling during construction. A fabric is woven having a thickness in the range of about 0.25–1.0 inches. The fabric preferably has two face and two back warp ends, a plurality of stuffer warp ends between the face and back, and binder warp ends interconnecting the face and back warp ends. The binder warp ends are preferably aramid, and the other warp ends preferably graphite. Pure carbon fiber inclusions may be provided in the interior of the fabric, and even in the face and back, and are connected up to a source of electricity to heat the fabric from within to produce a uniform resin flow. One or more layers of the fabric are impregnated with resin and formed into a desired shape by placing one or more layers into a die, bending around a radius to form a curved portion without wrinkling, folding, or pleating of the fabric of the layers, and then the fabric is further treated. Further treatment includes heating and curing, heating being effected both from the exterior and from the interior due to the pure carbon fiber inclusions.

9 Claims, 3 Drawing Figures

MULTIPLE, THICK GRAPHITE FABRIC PRODUCTION

BACKGROUND AND SUMMARY OF THE INVENTION

In the aerospace industry a number of component parts of vehicles are constructed from resin impregnated graphite materials since such materials have high strength and rigidity properties. For instance, component parts which have curved portions are assembled into larger structure such as wings, and empenage and fusealage panels. While the end product is normally satisfactory, there can be problems of delamination of the final products and the labor content of the manufacturing process is high.

In typical prior art procedures, a number of very thin fabric layers are placed in a die, after impregnation with resin, and the fabric layers are built up to the desired thickness. In many cases, dozens, or even a hundred layers may be necessary in order to build to the appropriate thickness, which can be, for example, up to 2 inches. This is a very time consuming procedure, and there is significant possibility for damage due to the great amount of handling that occurs. Also delamination is a real possibility since there are so many fabric layers, and since the product is so thick it is difficult to obtain uniform resin flow during manufacture.

Standard multilayer, single thickness fabrics are not satisfactory for use in place of the thin single layers since standard multilayer fabrics do not have the capability of smoothly fitting around a small die radius so as to create a final curved surface. In a standard multilayer fabric, a series of discrete layers are woven and then bound together by simply extending some of the warp or filling threads from one layer into the adjacent layer. Each layer is essentially a standard fabric with the same degree of stretch or elongation as any other layer of the structure. When bent around the curve, since both the top and bottom layers have the same elongation the bottom layer will crease or crinkle since the system is restricted to the length of the top layer. For instance, if it is necessary to bend a 0.25 inch fabric so that it will curve 180° around a 6 inch radius, the inside layer will require 9.43 inches of length to complete the curve while the outer layer (having a ¼ inch greater radius) will require 9.82 inches of length to reach the same position. This differential of 0.39 inches between the two layers will cause the inner layer to squeeze, resulting in wrinkling or creasing, which is unacceptable.

According to the present invention, a method of producing a resin impregnated graphite structure particularly for the aerospace industry, a woven fabric for producing the final resin impregnated structure, and an aerospace resin impregnated graphite final component part are provided, which overcome the disadvantages of the prior art mentioned above. According to the present invention it is possible to minimize the labor input in the construction of the final parts since less layering need be done. Also according to the present invention, since there is less handling there is less possibility of damage being induced by the handling. Further, since fewer layers exist and since there is the possibility of providing more uniform resin flow during construction, the probability of delamination is greatly reduced.

A basic feature of the present feature is utilization of a few relatively thick layers (e.g., each within the range of about 0.25–1.0 inch) to produce the final product, rather than a large number of thin layers. While thick layers are utilized, the thick layers according to the invention will not wrinkle, fold, crease or pleat when bent around even small radiuses during construction, and are entirely suitable for producing final products having curved portions.

According to one aspect of the present invention a woven fabric is provided for producing resin impregnated structural components having high strength and rigidity. The woven fabric comprises: two face and two back warp ends; a plurality of stuffer warp ends between the face and back; binder warp ends interconnecting the face and back warp ends; the binder warp ends selected from the group consisting of aramid, carbon, and black fibers; the face and back warp ends selected from the group consisting of graphite, carbon, PAN, and pitch fibers; and the fabric having a thickness in the range of about 0.25–1.0 inches. The binder warp ends preferably are primarily aramid, while the other warp ends are preferably primarily graphite. Pure carbon fiber inclusions are also provided in central portion of the fabric, the pure carbon fibers having known purity and crystallinity so that the resistivity thereof is well known, and electricity can be supplied to the fibers to provide heat to the interior of the fabric, and thus promote more uniform resin flow.

According to another aspect of the present invention there is provided an aerospace component part of resin impregnated graphite fiber having a relatively short radius curved portion, and composed of one or more resin impregnated cured layers of woven fabric, each layer comprising: two face and two back warp ends; a plurality of stuffer warp ends between the face and back; and binder warp ends interconnecting the face and back warp ends.

According to yet another aspect of the present invention, a method of producing a resin impregnated graphite structure having a curved portion thereof and having high strength and rigidity is provided. The method comprises the following steps: (a) Weaving a fabric having a thickness in the range of about 0.25–1.0 inches and comprising primarily graphite fiber. (b) Impregnating one or more layers of the fabric with resin. (c) Forming the fabric into a desired shape by placing one or more layers of the fabric into a die, bending the fabric around a radius to form a curved portion without wrinkling, folding, creasing, crinkling or pleating of the fabric; and (d) Further treating the impregnated fabric to produce a final resin impregnated graphite structure having a curved portion and high strength and rigidity. The further treating includes the step of heating the fabric, and this is preferably accomplished by providing the pure carbon fiber inclusions discussed above and supplying heat to the interior of the fabric utilizing those pure carbon fibers, either prior to or simultaneously with the application of heat to the fabric from the exterior thereof, to promote uniform resin flow.

It is the primary object of the present invention to provide for the simplified construction of resin impregnated graphite structures, with minimized probability of delamination while retaining capability to form curved portions. This and other objects of the invention will become clear from an inspection of the detailed description of the invention and from the appended claims.

DETAILED DESCRIPTION OF THE DRAWINGS

Figure 1:
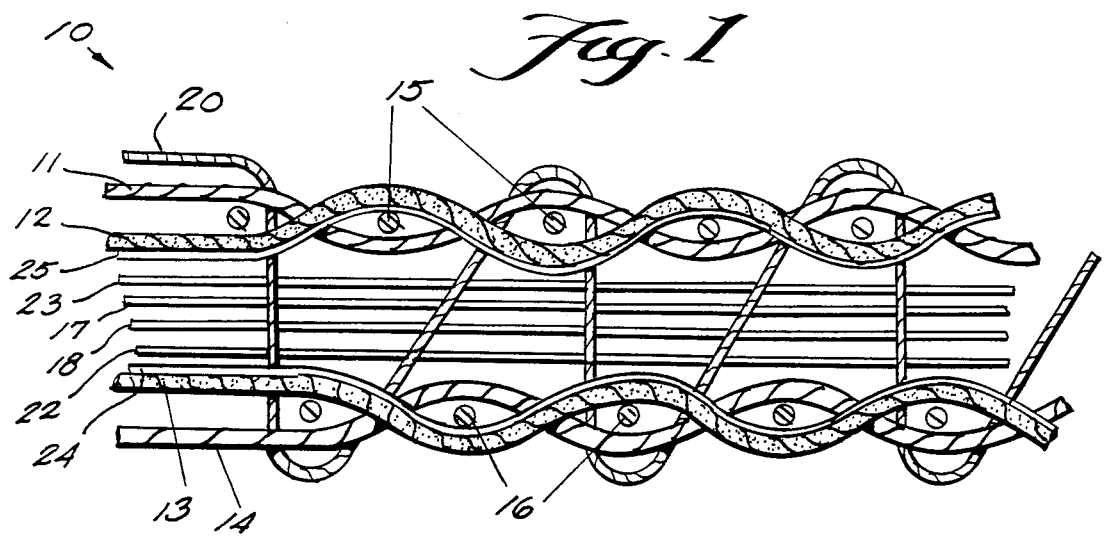
FIG. 1 is a side schematic view of an exemplary woven fabric according to the present invention.

An exemplary woven fabric for producing resin impregnated structural components having high strength and rigidity is illustrated schematically by reference numeral 10 in FIG. 1. Fabric 10 comprises two face warp ends 11, 12 and two back warp ends 13, 14. Preferably the face warp is a plain weave with the picks showing on the face, and the back warp is a plain weave with the picks showing on the back. Warps 11, 12, 13, 14, as well as the filling yarns 15, 16, are preferably selected from the group consisting of graphite, carbon, PAN, and pitch fibers, and more preferably are primarily graphite fibers. Graphite is highly heat treated carbon and has different crystallization than carbon per se. Graphite typically has a high modulus, while pure carbon has a low modulus. The term "graphite fiber" as commonly used means acrylic precursor high crystallinity carbon.

Fabric 10 also comprises a plurality of stuffer warp ends, preferably two stuffer warp ends 17, 18. The stuffer warp ends 17, 18 can be used to build up a thickness of the fabric 10 to the desired level, but preferably build up is accomplished by making the stuffer warp ends 17, 18 of heavier yarn rather than adding layers. However, under some circumstances, layers can be added thereto, as can layers be added to the face and back of the fabric 10. Yarn of the ends 17, 18 preferably also is primarily graphite, and/or of the same general types as the yarns 11, 12, 13, 14.

According to the present invention, stability of the fabric 10 in the Z axis (that is in the thickness dimension) is provided by utilizing binder yarn. For instance, as illustrated in FIG. 1, two binder warp ends 20 are utilized which extend in the Z dimension. The binder warp ends 20, as illustrated must approach a 90° angle to the principal plane of the fabric, and therefore should be of a high tenacity fiber. Such a high tenacity fiber preferably comprises aramid (e.g., Kevlar) fibers, or another fiber having tenacity comparable to aramid fiber. Alternatively, the binder warp ends may be selected from the group consisting of aramid, carbon, and black fibers, again aramid being preferred.

The fabric of FIG. 1 may be produced utilizing known speciality weaving machines. For instance, a multiple beam loom manufactured by Dornier of Lindau/Bodensee, West Germany, and Charlotte, North Carolina, known as the Dornier Terry Weaving Machine may be utilized. Typically the binder warp would weave 2 up-2 down, and there would be 16 stuffer-warp ends between each binder.

Fabric 10 of FIG. 1 can easily be constructed having a thickness in the range of 0.25–0.5 inches, and even with thicknesses up to about 1.0 inch. Utilizing fabric 10 that is that thick, the number of layers necessary in order to form a given structural component can be greatly reduced. For instance, in the construction of structural components which would typically have a thickness in the range of about 0.25–2.0 inches, typically only 1–10 layers of fabric 10 would be necessary. This should be compared to typical present commercial situations wherein dozens of fabric layers are commonly utilized.

Because the fabric 10 is so thick, in order to facilitate uniform resin flow it is desirable to also provide pure carbon fiber inclusions. That is, carbon fibers having known purity and crystallinity would also have known resistivity, and if those carbon fibers are connected up to a source of electricity they can be counted on to provide a known quantity of heat to the interior of the fabric 10, and can either be set at a maximum or controlled by voltage input. For instance, a number of pure carbon fibers such as the fibers 22, 23 illustrated in FIG. 1 may be provided, in conjunction with the stuffer warp ends in the interior of the fabric 10. Under some circumstances, it may also be desirable to provide some pure carbon fibers 24, 25 in association with the warp ends 13, 12 respectively. The amount of pure carbon fiber should be minimized since it is not as strong as the graphite or aramid fibers.

Utilizing the fabric of FIG. 1, a final component part in the aerospace industry may be produced. Component parts that may be produced include structures which may be assembled to form wings, and empennage and fuselage panels. For instance, the part 30 illustrated in FIG. 2 can be produced. That part 30, which could comprise a part of a wing, has a relatively short radius curved portion 31. To illustrate the manner of its construction, the part 30 is illustrated as having two distinct composite layers 32, 33, each of which would correspond to a layer of woven fabric 10. However, in actual practice one would not normally be able to see a clear line of demarcation between the layers 32, 33; rather it would be blurred, and there would be minimal chance for delamination.

Figure 2:
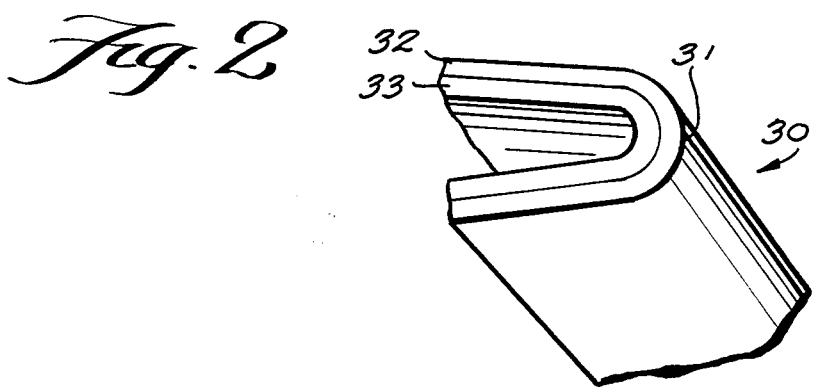
FIG. 2 is a perspective schematic view of an exemplary aerospace component part (a wing part) which may be constructed by practicing the invention.
Figure 3:
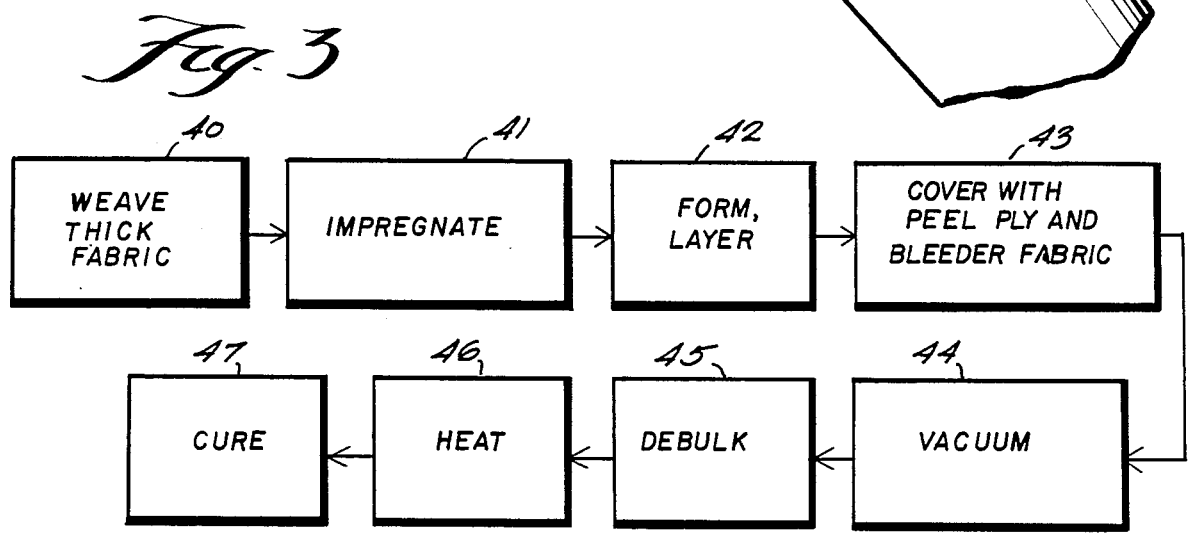
FIG. 3 is a block diagram indicating the various steps that may be followed in the practice of the method according to the present invention.

FIG. 3 schematically illustrates an exemplary method according to the present invention for producing a resin impregnated structure having a curved portion (like the portion 31 in FIG. 2), and having high strength and rigidity. The first step in the practice of the method is illustrated schematically at 40, and comprises weaving a fabric having a thickness in the range of about 0.25–1.0 inches, and comprising primarily graphite fiber. Second stage 41 is the impregnation of the fabric (in fact one or more layers of the fabric) with resin, such as epoxy or phenolic resins. Next, at station 42, the fabric is formed into the desired shape by placing one or more layers into a forming die, bending the fabric around a radius of the die to form a curved portion, and this bending and forming action taking place without wrinkling, creasing, folding or pleating of the fabric of the layers. In actual practice only 1–10 layers would be necessary even to form parts having thicknesses in the range of about 0.5–2.0 inches.

As is conventional in many resin impregnation processes, at step 43 the fabric would be covered with a peel ply and a bleeder fabric, and put into a vacuum bag. The peel ply does not react with the resin, and typically could comprise a woven nylon typewriter ribbon, or glass or Teflon treated glass, which gives a smooth surface to the part when it is removed. Vacuum is applied as indicated at step 44 in FIG. 3, and then the fabric is subjected to debulking at step 45. Typically the debulking step would be a compression step to squeeze the air out of the fabric. Next the fabric would be subjected to heat at stage 46. Typically the heat would be applied from the exterior of the fabric, however according to the present invention it is also desirable to supply heat to the interior of the fabric by supplying electricity to the carbon fiber inclusions 22–25. Heating can be accomplished by first applying electricity to the carbon fiber inclusions and after they have started uniform resin flow, then supplying heat from the exterior of the fabric; or, alternatively, heat from the carbon inclusions and from the exterior of the fabric may be applied simultaneously. In any event, the heat causes the resin to flow to the bleeder cloth, the flow being very uniform according to the invention.

After the heating step 46, the fabric is removed from the vacuum, and the peel ply and bleeder cloth also removed, and then it is cured at stage 47. The final product, such as the product 30 illustrated in FIG. 2, is then ready for use.

It will thus be seen that according to the present invention it is possible to produce resin impregnated graphite structures having curved portions and high strength and rigidity with minimal work content, lowered probability of delamination, and less induced damage during handling. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and methods.

What is claimed is:

1. A method of producing a resin impregnated graphite structure having a curved portion thereof, and having high strength and rigidity, comprising the steps of:
   (a) weaving a fabric having a thickness in the range of about 0.25–1.0 inches and comprising primarily graphite fiber;
   (b) impregnating one or more layers of the fabric with resin;
   (c) forming the fabric into a desired shape by bending the fabric to form a curved portion without wrinkling, folding, creasing, crinkling or pleating of the fabric; and
   (d) further treating the impregnated fabric to produce a final resin impregnated graphite structure having a curved portion and high strength and rigidity.

2. A method as recited in claim 1 wherein (d) is practiced by covering the fabric with a peel ply and bleeder fabric, and placing it in a vacuum bag; debulking the fabric to remove the air therefrom; heating the fabric to make the resin flow to the bleeder cloth; and after removal of the fabric from vacuum, curing the resin in the fabric.

3. A method as recited in claim 2 wherein the fabric further comprises carbon fiber inclusions in a central portion thereof, the carbon fiber inclusions having a known purity and crystallinity, and therefore known heat characteristics; and wherein said heating step is practiced by supplying electricity to the carbon fiber inclusions so as to effect heating of interior portions of the fabric, and therefore obtaining uniform resin flow.

4. A method as recited in claim 3 wherein said heating step is practiced by applying electricity first to the carbon fiber inclusions, and after heating of the interior of the fabric to provide resin flow, applying heat to the fabric from the exterior thereof.

5. A method as recited in claim 1 wherein step (d) includes the step of heating the fabric to make the resin flow to the bleeder cloth; and wherein the fabric further comprises carbon fiber inclusions in a central portion thereof, the carbon fiber inclusions having a known purity and crystallinity, and therefore known heat characteristics; and wherein said heating step is practiced by supplying electricity to the carbon fiber inclusions so as to effect heating of interior portions of the fabric, and therefore obtaining uniform resin flow.

6. A method as recited in claim 5 wherein said heating step is practiced by applying electricity first to the carbon fiber inclusions, and after heating of the interior of the fabric to provide resin flow, applying heat to the fabric from the exterior thereof.

7. A method as recited in claim 5 wherein said heating step is practiced by simultaneously applying electricity to the carbon fiber inclusions, and heat from exteriorly of the fabric.

8. A method as recited in claim 1 wherein step (a) is practiced by weaving two face and two back warp ends, and a plurality of stuffer warp ends between the face and back, and utilizing binder warp ends interconnecting the face and back warp ends, the binder warp ends selected from the group consisting of aramid, carbon, and black fibers, and the face and the back warp ends selected from the group consisting of graphite, carbon, PAN, and pitch fibers.

9. A method as recited in claim 1 wherein steps (b) and (c) are practiced by utilizing a plurality of layers each in the range of about 0.25–1.0 inches thick, and disposing them one on top of the other, to provide a resin impregnated product in the die having a thickness in the range of about 0.5–2.0 inches.

* * * * *